United States Patent [19]
Pitner

[11] 3,983,765
[45] Oct. 5, 1976

[54] RACK AND PINION STEERING MECHANISM

[75] Inventor: Alfred Pitner, Paris, France

[73] Assignee: Nadella, France; a part interest

[22] Filed: Dec. 13, 1973

[21] Appl. No.: 424,303

[30] Foreign Application Priority Data
Dec. 22, 1972   France .............................. 72.46069

[52] U.S. Cl. ................................... 74/498; 308/122
[51] Int. Cl.² ......................................... B62D 1/20
[58] Field of Search .............. 74/498, 422; 308/122, 308/.003

[56] References Cited
UNITED STATES PATENTS

| | | | |
|---|---|---|---|
| 1,817,891 | 8/1931 | Claus ...................... | 308/DIG. .003 |
| 3,517,973 | 6/1970 | Hirs ..................................... | 308/122 |
| 3,630,099 | 12/1971 | Miyoshi ................................ | 74/422 |
| 3,745,850 | 7/1973 | Bayle ................................... | 74/422 |
| 3,762,240 | 10/1973 | Adams ................................. | 74/422 |

*Primary Examiner*—Samuel Scott
*Assistant Examiner*—Wesley S. Ratliff, Jr.
*Attorney, Agent, or Firm*—Robert E. Burns; Emmanuel J. Lobato; Bruce L. Adams

[57] ABSTRACT

The pinion of a rack and pinion steering mechanism is assembled in a case by means of two bearings mounted on two bearing portions at each end of the pinion which are integral parts of the pinion. The bearings are capable of acting as two axial abutments for the pinion. One of the bearings is a cup acting as a smooth bearing. Longitudinally extending lubricating grooves are provided in the bearing portion within the cup. These grooves are extensions of the spare between roots of the gear teeth of the pinion and are machined by causing the tooth cutter to continue beyond the pinion and thereby cut the grooves in the bearing portion.

8 Claims, 2 Drawing Figures

RACK AND PINION STEERING MECHANISM

The present invention relates to a rack and pinion steering mechanism of an automobile vehicle, comprising a shaft element having two end portions respectively journalled in a case by two bearings between which bearings the pinion is disposed, the bearings being capable of acting as axial abutments in both directions for the assembly comprising the pinion and the shaft element.

The applicant has already proposed to use as bearings, two needle or roller bearings which are capable, when employed together, of acting as axial abutments in both directions for the assembly formed by the pinion and the shaft element. An object of the present invention is to provide a simpler and cheaper rack and pinion steering mechanism, wherein the pinion is in one integral piece with the shaft element and the bearing located at one end of the shaft element comprises a cup forming a smooth sleeve bearing, the cylindrical inner surface of the cup being in sliding contact with a cylindrical outer bearing surface of the shaft element which is provided with longitudinal lubricating grooves axially extending spaces between the roots of the teeth of the pinion. These grooves, which may be machined by a tool no other than the milling cutter which machines the teeth of the pinion, are correctly supplied with lubricant or grease since the torque between the pinion and the rack laterally expels the grease from each side of the zone of mutual contact.

The cup ma be retained in the bore therefor by any known means and in particular by an anchoring spider member constituting an embedded washer, in accordance with the teaching of the U.S. Pat. No. 3,062,026. There may also be employed a stop ring, radial projections obtained by localized deformations of the wall of the bore or these means may be employed in combination. The cup may have a continuous or discontinuous radially extending outer flange which in the event of the displacement or absence of the anchoring spider member consitutes a safety abutment collar which bears against the inside of the case.

The integral pinion and shaft element of the rack and pinion mechanism in accordance with the invention is economically formed, for example by turning a portion of a blank at at least one end of the portion pertaining to the pinion, a cylindrical surface having a diameter exceeding the nominal diameter of the bearing portion to be obtained, machining the pinion and causing the cutter to move beyond the pinion onto the end of the blank corresponding to the shaft end so as to simultaneously form in this end portion grooves extending space between the roots of the teeth of the pinion, and grinding said cylindrical end portion or ortions so as to bring them to the desired dimension and form the desired bearing portions.

Further features and advantages of the invention will be apparent from the ensuing description with reference to the accompanying drawing.

Figure 1:
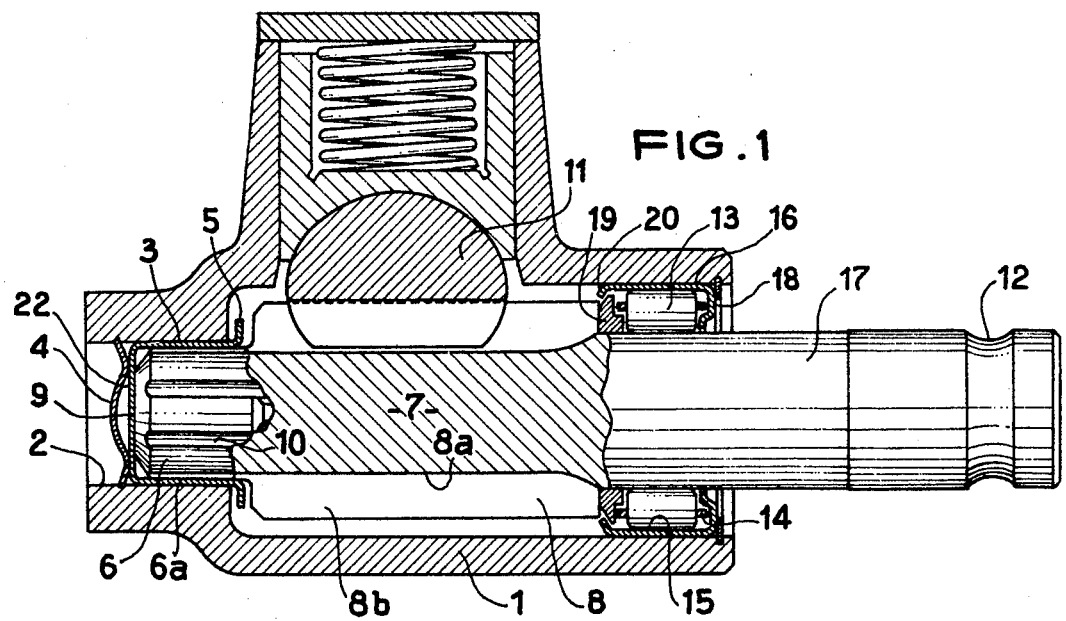
FIG. 1 is an axial sectional view of a case of a rack and pinion steering mechanism whose shaft element is assembled with the case by means of a smooth bearing and a needle or roller bearing.

The case or housing 1 of the steering mechanism shown in FIG. 1 is open at both ends and defines a stepped bore whose part 2 of smaller diameter receives a sheet metal cup 3 which constitutes a smooth bearing and is retained by an anchoring spider member 4 engaged in the bore portion 2. This cup 3 has an outer radial flange 5 which is capable, in the event of displacement or absence of the anchoring spider 4, of abutting the wall of the cavity defined by the case 1.

In order to facilitate the journalling of the end portion 6 of the shaft element 7 carrying the rack pinion 8, it is arraged to machine simultaneously in a single blank for the pinion and the end portion 6, the teeth of the pinion and lubricating grooves 10 in the end portion 6 by causing the teeth cutting tool which machines the teeth $8^b$ of the pinion 8, to travel beyond the pinion and up to the end face 9 of the shaft element 7 and to grind the end portion 6 of the shaft element down to a diameter to provide a cylindrical bearing portion $6^a$ which can journal in the cup 3 with the desired clearance. As seen in FIG. 1, the end portion 6 of the shaft element 7 is ground down to a diameter which is less than the diameter of the pitch circle and greater than the diameter of the root circle of the pinion 8 so that the lubricating grooves 10 are axial extensions of the dedendum portions of the spaces between gear teeth of the pinion.

Lubricating grooves 10 are thus formed without any special tool being required since the grooves 10 extend dedendum portions 8a of the spaces between the gear teeth. These grooves are always fed with lubricant since the assembled pinion 8 and rack 11 laterally expel the grease from their region of mutual contact toward the grooves 10 of the end portion 6 of the shaft element 7, which grooves extend inside the cup 3.

The other end portion 17 of the shaft element 7 which extends out of the case 1 has a groove 12 for receiving a bolt which is engaged tangentially in this groove for securing a split collar of a universal joint yoke.

The bearing of the pinion 8 opposed to the cup 3 is a rolling bearing comprising needles or rollers 13 which are guided by a cage 14. The outer raceway 15 is defined by a ring 16 and the inner raceway is formed by the portion 17 which constitutes a bearing portion.

The needles or rollers 13 bear at one end against a radial flange 18 of the ring 16 and at the other end against a washer 19 which bears against the end faces of the teeth of the pinion 8. The ring 16 has a flange 20 which retains the washer 19 when handling the rolling bearing.

Figure 2:
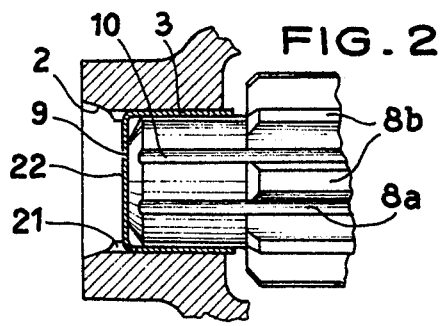
FIG. 2 is a partial axial sectional view of a modification of the structure shown in FIG. 1.

FIG. 2 shows a modification of the structure described hereinbefore in which the cup 3 is retained in the bore portion 2 by a local radial deformation 21 of the metal of the case 1 defining this bore portion.

It is clear from FIGS. 1 and 2 that the end face 9 of the shaft element 7 can bear against the end wall 22 of the cup 3.

Having now described my invention what I claim as new and desire to secure by Letters Patent is:

1. A rack and pinion steering mechanism comprising a case, a pinion defining gear teeth and spaces between the gear teeth, a first shaft portion extending axially from one end of said pinion and having a first cylindrical bearing surface whose diameter is less than the diameter of the pitch circle and greater than the diameter of the root circle of the pinion teeth and defining a shaft end face, a second shaft portion extending axially from the other end of said pinion and having a second cylindrical bearing surface, the first shaft portion and second shaft portion being integral parts of the pinion, two bearings respectively located in the case adjacent opposite ends of the pinion for mounting the pinion in the case and rotatably receiving the two cylindrical bearing surfaces and capable of acting as two axial abutments for the pinion in both directions of axial movement of the pinion, and longitudinally extending lubricating grooves in the first cylindrical bearing surface which grooves are axial extensions of dedendum portions of said spaces between gear teeth of the pinion, the bearing receiving the first bearing surface being in the form of a smooth sleeve bearing consisting of a cup defining a cylindrical inner surface which is in rotary sliding contact with the first bearing surface, said lubricating grooves extending inside the cup to supply lubricant to interengaging cylindrical rotary sliding contact surfaces of said first shaft portion and said cup.

2. A device as claimed in claim 1, wherein the cup has a transverse closed end wall adjacent the shaft end face and an outer flange which is at the opposite end of the cup to said transverse end wall for abutting the case.

3. A rack and pinion steering mechanism comprising a case, a pinion defining gear teeth and spaces between the gear teeth, a first shaft portion extending axially from one end of said pinion and having a first cylindrical bearing surface whose diameter is less than the diameter of the pitch circle and greater than the diameter of the root circle of the pinion teeth and defining a shaft end face, a second shaft portion extending axially from the other end of said pinion and having a second cylindrical bearing surface, the first shaft portion and second shaft portion being integral parts of the pinion, two bearings respectively located in the case adjacent opposite ends of the pinion for mounting the pinion in the case and rotatably receiving the two cylindrical bearing surfaces and capable of acting as two axial abutments for the pinion in both directions of axial movement of the pinion, and longitudinally extending lubricating grooves in the first cylindrical bearing surface which grooves are axial extensions of dedendum portions of said spaces between gear teeth of the pinion, the bearing receiving the first bearing surface being in the form of a smooth sleeve bearing consisting of a cup defining a cylindrical inner surface which is in rotary sliding contact with the first bearing surface, said lubricating grooves extending inside the cup to supply lubricant to interengaging cylindrical rotary sliding contact surfaces of said first shaft portion and said cup, the bearing receiving the second cylindrical bearing surface being a rolling bearing comprising rolling elements, a ring defining an outer raceway for the rolling elements, an inner raceway defined by the second cylindrical bearing surface, a radially-extending surface on the ring at an end of the ring remote from the pinion, a washer which bears against an end face of the pinion, the rolling elements being axially supported between the radially extending surface and the washer, and axial retaining means for the washer on the corresponding end of the ring.

4. A device as claimed in claim 3, wherein said axial washer retaining means comprise a flange which extends radially inwardly to axially retain a peripheral outer portion of the washer.

5. A gear pinion having a coaxial shaft portion extending axially at an end of the pinion, the pinion defining gear teeth and spaces of uniform depth between the gear teeth, the pinion and shaft portion consisting of one integral piece, the shaft portion defining a cylindrical bearing surface whose diameter is less than the diameter of the pitch circle and greater than the diameter of the root circle of the pinion teeth for receiving a sleeve bearing and having throughout its length longitudinally extending lubricating grooves of uniform depth in the bearing surface which grooves are axial extensions of dedendum portions of said spaces between gear teeth of the pinion.

6. A structure comprising in combination a case defining a cavity and two coaxial bores at opposite sides of said cavity, a gear pinion disposed within the cavity and defining gear teeth and spaces between the gear teeth, a second gear member meshing with the pinion in said cavity so that the pinion and the second gear member are operative together, a first shaft portion extending axially from one end of said pinion and having a first cylindrical bearing surface whose diameter is less than the diameter of the pitch circle and greater than the diameter of the root circle of the pinion teeth and defining a shaft end face, a second shaft portion extending axially from the other end of said pinion and having a second cylindrical bearing surface, the first shaft portion and second shaft portion being integral parts of the pinion, and two bearings respectively mounted in said bores of said case adjacent opposite ends of the pinion and rotatably receiving the two cylindrical bearing surfaces and capable of acting as two axial abutments for the pinion in both directions of axial movement of the pinion, means for axially retaining said bearings in the respective bores, longitudinally extending lubricating grooves in the first cylindrical bearing surface which grooves are axial extensions of dedendum portions of said spaces between gear teeth of the pinion, the bearing receiving the first bearing surface being in the form of a smooth sleeve bearing consisting of a cup defining a cylindrical inner surface which is in rotary sliding contact with the first bearing surface, said lubricating grooves extending inside the cup, said cavity being adapted to contain lubricant which can reach the interior of the cup via said lubricating grooves to supply lubricant to interengaging cylindrical rotary sliding contact surfaces of said first shaft portion and said cup.

7. A structure comprising in combination a case defining a cavity and two coaxial bores at opposite sides of said cavity, a gear pinion disposed within the cavity and defining gear teeth and spaces between the gear teeth, a second gear member meshing with the pinion in said cavity so that the pinion and the second gear member are operative together, a first shaft portion extending axially from one end of said pinion and having a first cylindrical bearing surface whose diameter is less than the diameter of the pitch circle and greater than the diameter of the root circle of the pinion teeth and defining a shaft end face, a second shaft portion extending axially from the other end of said pinion and having a second cylindrical bearing surface, the first shaft portion and second shaft portion being integral parts of the pinion, and two bearings respectively mounted in said bores of said case adjacent opposite ends of the pinion and rotatably receiving the two cylindrical bearing surfaces and capable of acting as two axial abutments for the pinion in both directions of axial movement of the pinion, means for axially retaining said bearings in the respective bores, longitudinally extending lubricating grooves in the first cylindrical bearing surface which grooves are axial extensions of dedendum portions of said spaces between gear teeth of the pinion, the bearing receiving the first bearing surface being in the form of a smooth sleeve bearing consisting of a cup defining a cylindrical inner surface which is in rotary sliding contact with the first bearing surface, said lubricating grooves extending inside the cup, said bearing retaining means comprising radial projecting portions consisting of localized deformations of a wall of the respective one of said bores engaging an end of the cup remote from the pinion to axially retain the cup in said bore, said cavity being adapted to contain lubricant which can reach the interior of the cup via said lubricating grooves to supply lubricant to interengaging cylindrical rotary sliding contact surfaces of said first shaft portion and said cup.

8. A structure comprising a case defining a caavity and two coaxial bores at opposite sides of said cavity, a rack slidably mounted in the case, a pinion meshed with the rack in the cavity and defining gear teeth and spaces between the gear teeth, a first shaft portion extending axially from one end of said pinion and having a first cylindrical bearing surface whose diameter is less than the diameter of the pitch circle and greater than the diameter of the root circle of the pinion teeth and defining a shaft end face, a second shaft portion extending axially from the other end of said pinion and having having a second cylindrical bearing surface, the first shaft portion and second shaft portion being integral parts of the pinion, and two bearings respectively mounted in said bores of said case adjacent opposite ends of the pinion and rotatably receiving the two cylindrical bearing surfaces and capable of acting as two axial abutments for the pinion in both directions of axial movement of the pinion, means for axially retaining said bearings in the respective bores, longitudinally extending lubricating grooves in the first cylindrical bearing surface which grooves are axial extensions of dedendum portions of said spaces between gear teeth of the pinion, the bearing receiving the first bearing surface being in the form of a smooth sleeve bearing consisting of a cup defining a cylindrical inner surface which is in rotary sliding contact with the first bearing surface, said lubricating grooves extending inside the cup, said cavity being adapted to contain lubricant which can reach the interior of the cup via said lubricating grooves to supply lubricant to interengaging cylindrical rotary sliding contact surfaces of said first shaft portion and said cup.

* * * * *